July 14, 1925.

O. LINDEMANN

BIRD CAGE DRAWER

Filed Aug. 2, 1924

1,545,671

INVENTOR
Oscar Lindemann
BY
ATTORNEYS

Patented July 14, 1925.

1,545,671

UNITED STATES PATENT OFFICE.

OSCAR LINDEMANN, OF TOMPKINSVILLE, NEW YORK.

BIRD-CAGE DRAWER.

Application filed August 2, 1924. Serial No. 729,696.

*To all whom it may concern:*

Be it known that I, OSCAR LINDEMANN, a citizen of the United States, residing at Tompkinsville, in the county of Richmond and State of New York, have invented new and useful Improvements in Bird-Cage Drawers, of which the following is a specification.

This invention relates to a drawer especially adapted for round bird cages which is arranged in the bottom receptacle and it can be slid out when it is desired to clean or renew the gravel while the cage is suspended or placed on an object.

The invention is designed to provide the cut-out portion of the bottom receptacle for fitting the drawer with reinforcement means whereby the bottom is braced and prevented particularly adjacent the cut-out from collapsing.

An object of the invention is to provide the bottom with a device coacting with the drawer and made to prevent accidental withdrawal of the drawer when the cage is shifted or tilted.

Heretofore, it was practically impossible to make a circular cage with a removable drawer because the bottom which is usually spun of thin metal would have to be cut to form an opening for the drawer thus weakening the side contiguous to the opening with consequent sagging and breakage.

The invention resides more particularly in the novel combinations hereinafter described and claimed, reference being made to the accompanying drawing in which:—

Figure 1:
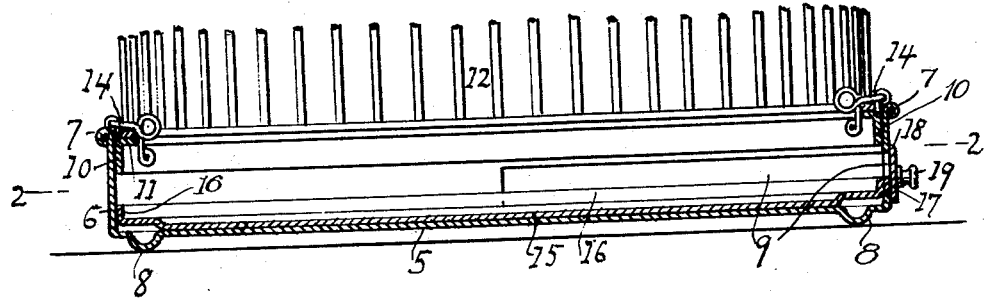
Fig. 1 represents a vertical section showing the lower portion of a bird cage.
Figure 2:
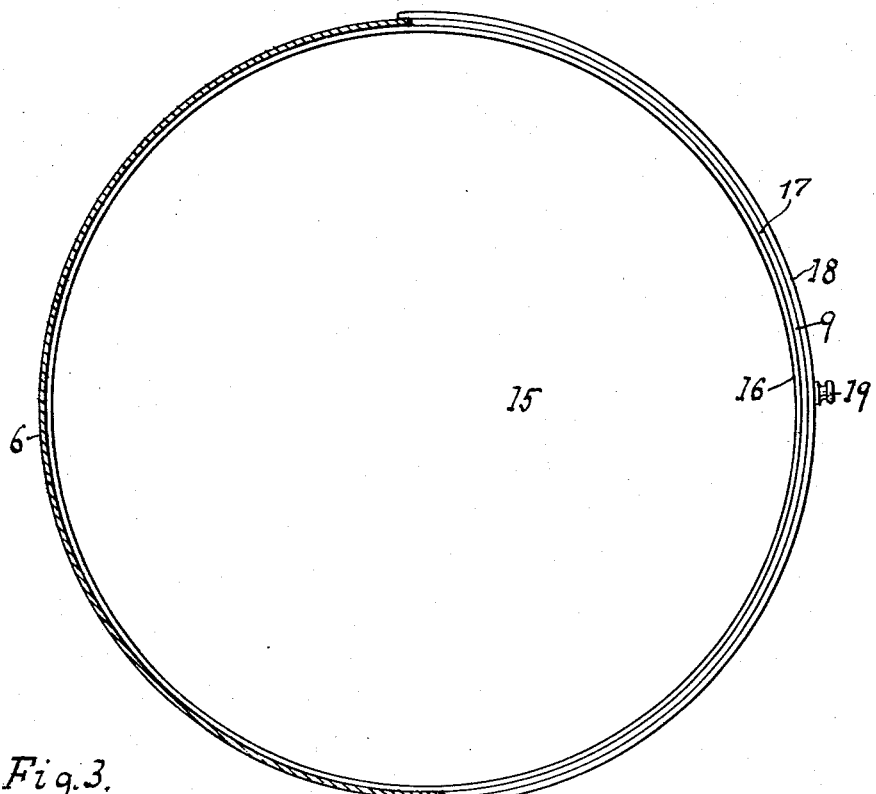
Fig. 2 is a horizontal section taken along the line 2 2 of the same.
Figure 3:
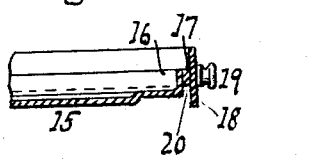
Fig. 3 is a detail section of a drawer.

In the drawing the numeral 5 designates a bottom having a vertical wall 6 provided with beaded rim 7 located at the top. The bottom and wall form a circular receptacle and the bottom has an annular channel 8 to strengthen it and at the same time support the receptacle when placed on an article. The receptacle is spun or stamped from a single sheet of metal and it is provided with a segmental slot or opening 9 extending halfway about the circumference of the side.

The slot weakens the side and in order to reinforce it a band 10 is soldered or riveted to the inside of the receptacle above the slot. There can be other means employed for reinforcing the side; for example, by fastening one or more metal rings or collars on the inside or outside or by spinning one or more channels in the side of the receptacle. The band has an integral flanged rim 11 at its top for supporting a wire cage 12 which rests on the top of the flange. The cage is attached to the bottom receptacle by a series of wire clips or hooks 14 swingingly mounted on the top of the beaded side.

In order to facilitate cleaning of the bottom without removing the cage a drawer which includes a circular bottom 15 having turned up rims 16 to form a shallow pan for holding gravel can be slid through the slot. The rim has soldered or otherwise fastened to it a boss or segmental member 17 and a front member 18 brazed or soldered to the boss. The front member covers the entire slot and it has a finger button 19 to grasp when necessary to pull out the drawer.

The bottom 15 of the pan and its front member 18 in conjunction with the boss forms a groove 20 which when the drawer is in place is engaged by the lower rim of the slot to prevent it from sliding or falling out when the cage is moved. When it is desired to pull out the drawer to remove the soiled gravel, seed husks and so forth it will be necessary to raise the front of the drawer until the bottom 15 rests on the lower edge of the slot thereby permitting the drawer to be slid out of the slot.

I claim:—

1. In a cage drawer the combination with a circular bottom receptacle having a segmental slot, of a drawer having a groove arranged in the bottom receptacle, and means adjacent the slot engaging the groove to obviate accidental movement of the drawer.

2. In a cage drawer the combination with a circular receptacle having a segmental slot cut in the side of the receptacle, a drawer arranged in the receptacle with its front covering the slot, and means for reinforcing the receptacle to prevent sagging of its side.

3. In a cage drawer the combination with a circular receptacle formed from a single piece of material having a segmental slot cut in the side of the receptacle, a drawer arranged in the receptacle with the front covering the slot, and means for reinforcing the receptacle to prevent sagging of its side.

In testimony whereof I have hereunto set my hand.

OSCAR LINDEMANN.